United States Patent [19]

Bermas

[11] 3,927,327
[45] Dec. 16, 1975

[54] EXCHANGE MECHANISM FOR FILM PLATES IN AN X-RAY RECORDING OR DISPLAYING APPARATUS

[75] Inventor: Gunnar Valfrid Bermas, Stockholm, Sweden

[73] Assignee: U. S. Philips Corporation, New York, N.Y.

[22] Filed: Mar. 18, 1974

[21] Appl. No.: 451,781

[30] Foreign Application Priority Data
Mar. 16, 1973 Sweden .............................. 7303710

[52] U.S. Cl. ................................ 250/470; 250/468
[51] Int. Cl.² ........................................... G11B 1/00
[58] Field of Search ........... 250/468, 469, 470, 471, 250/475, 491, 521

[56] References Cited
UNITED STATES PATENTS
2,652,498  9/1953  Snook et al. ....................... 250/470
3,529,154  9/1970  Bouwmeester ..................... 250/470

Primary Examiner—James W. Lawrence
Assistant Examiner—B. C. Anderson
Attorney, Agent, or Firm—Frank R. Trifari; Ronald L. Drumheller

[57] ABSTRACT

An exchange mechanism in X-ray recording or displaying apparatuses for feeding rectangular or square shaped X-ray film plates from a first store to active position for exposure or irradiation opposite an opening in a support plate and from this position after exposure or irradiation to a second store at the same time as always a new film plate is fed-in from the first store, comprising two similar feeding devices each situated at a corner of the film plate, when this is in the correct position for exposure or irradiation, and each consisting of a swingable or rotatable grip device adapted to grip the respective corner of the film plate and produce feeding-in and feeding-out of the film plate by a swinging motion of the film plate about an axis, which is perpendicular to the plane of the film plate, after the gripping of the respective corner.

4 Claims, 1 Drawing Figure

U.S. Patent   Dec. 16, 1975   3,927,327
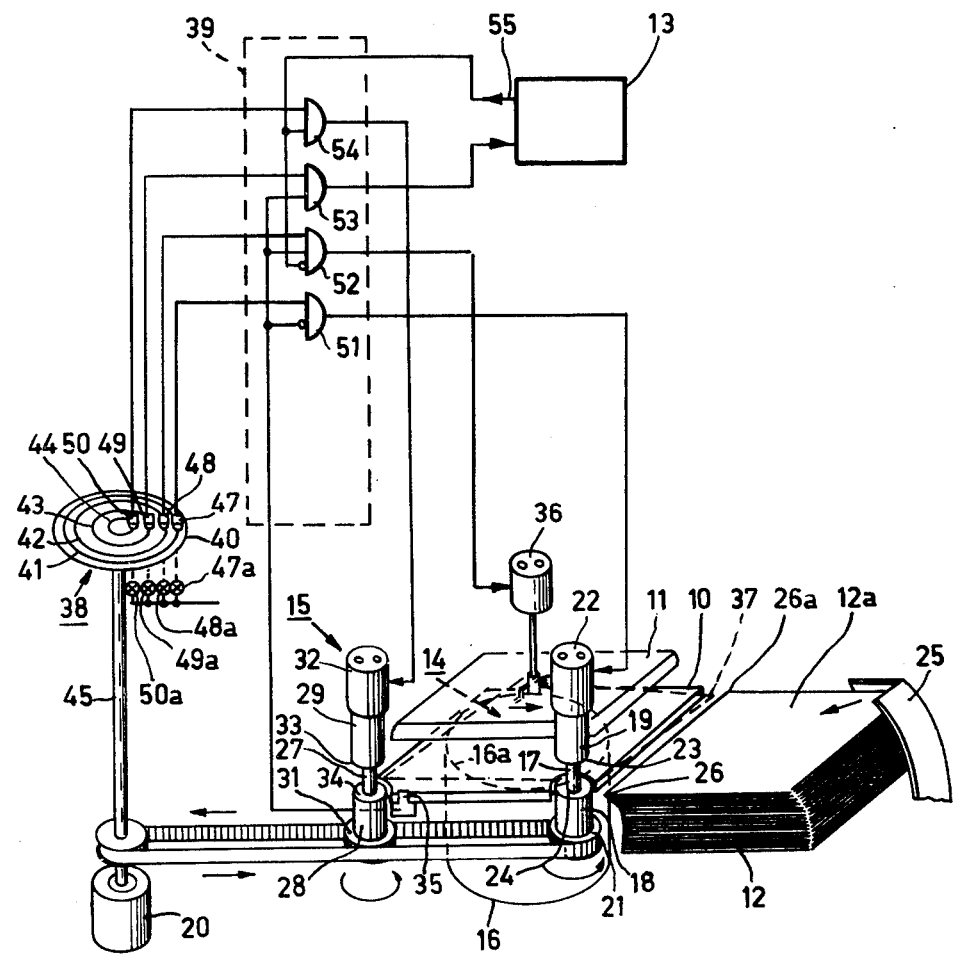

EXCHANGE MECHANISM FOR FILM PLATES IN AN X-RAY RECORDING OR DISPLAYING APPARATUS

The invention relates to an exchange mechanism adapted to be used in an X-ray recording or displaying apparatus for feeding-in of individual X-ray film plates of rectangular or square shape from a first store to exposure or irradiation position opposite an opening in a support plate, in which position exposure or irradiation, respectively, is effected, and feeding-out of the plate after exposure or irradiation, respectively, to a second store at the same time as always a new film plate is fed-in from the first store, the feeding-in and feeding-out being effected by a motion of the film plate in its own plane.

In previously known devices of this kind the feeding of the individual plates to and from active position is effected thereby that they are displaced laterally along a substantially linear motion track by means of drive rollers or wheels arranged along the motion track in such manner that they engage two opposite side edges of the plates.

An essential drawback for such an exchange mechanism is that the picture exchange speed will be limited to relatively small values, of the magnitude some few pictures per second. A contributing cause to this is that for mechanical reasons it is difficult to start feeding-in a new plate before the previous plate is feeding-out from the active position. Another cause is the large motion length required for each driving wheel during feeding-in and feeding-out and the large inertia mass in the driving wheels, which will limit the motion speed in view of the necessary braking at reaching the correct position.

Another drawback for such an exchange mechanism is that it requires a large initial transporting distance for the individual plates at the input side in order to bring the plates into engagement with the said driving wheels, which then produce the final feeding to the exposure position or irradiation position, respectively.

A further drawback is that relatively large parts of the plates, where the driving wheels are in engagement with the plates, cannot be utilized for exposure.

The object of the invention is to eliminate these drawbacks and produce a device of described kind, which in spite of greater simplicity produces higher picture exchange speed than the known devices and a larger percentage of surface free for exposure. According to the invention this is achieved with an exchange mechanism that comprises two substantially equal feeding-in and feeding-out mechanisms each situated at a corner of the film plate, when the film plate is in its active position. These mechanisms each have the shape of a grip device, which is swingable about an axis which is substantially perpendicular to the film plane. An input transport means introduces a corner of a film plate between the grip surfaces of the grip device situated at the input feeding side and a control device is adapted to control the grip devices in such manner that in a first moment the grip device situated at the input side will grip the introduced corner of the film plate and thereafter swing the plate into the active position, at which time another corner of the plate is introduced into the second grip device which, after exposure or irradiation, ejects the plate by a similar swinging motion.

A very simple exchange mechanism is achieved if each grip device consists of a sleeve, which is displacably arranged on a fixed shaft and actuated by a motion mechanism adapted to displace the sleeve along the shaft for squeezing an introduced corner of a film plate between the end surface of the sleeve and a cooperating counter surface, which may be shaped as the end surface of a similar sleeve, the said sleeve or in case of two sleeves at least one of these sleeves being rotatably arranged on the shaft and adapted to produce feeding-in and feeding-out, respectively, by a rotation motion after gripping the corner of the film plate.

The invention is illustrated in the accompanying drawing, which shows a simple embodiment of a picture exchange mechanism according to the invention, the mechanical part being shown in a perspective view, in which only those parts, which are necessary for the understanding of the invention, are shown and the electronic control device being shown in the shape of a simplified logical function diagram.

In the drawing reference numeral 10 designates a support plate forming support for the X-ray film plates during exposure, 11 is a pressure plate for holding the film plate in position during exposure, 12 is a pile of unexposed X-ray plates, 13 is an X-ray apparatus and 14, 15 are feeding mechanisms according to the invention for feeding-in of unexposed plates from the pile 12 to exposure position on the support plate 10 and feeding-out of the plates after exposure, respectively, to a store (not shown) at the left on the drawing.

Feeding-in of the uppermost film plate 12a in the pile 12 to exposure position opposite a light channel 16, the opening 16a of which emerges into the support plate 10, is produced by the device 14. The device 14 which is situated at the right hand front corner of the support plate 10 consists of a fixed shaft 17, on which two sleeves 18, 19 are rotatably arranged. In the present example the lower sleeve 18 is assumed to be driven continuously from a motor 20 through a gear wheel 21. The upper sleeve 19 is rotatably and also axially displaceably arranged on the shaft 17. The axial displacement is controlled by an electromagnet 22, which upon excitation will displace the sleeve downwardly until the lower end surface 23 of the sleeve is pressed against the upper end surface 24 of the sleeve 18. When the excitation of the electromagnet 22 ceases the sleeve 19 will be displaced upwardly by a spring (not shown). The upper end surface 24 of the sleeve 18, which is situated in height with the upper side of the plate 10, it as well as the surface 23 of the sleeve 19 provided with a friction layer.

The pile 12 of unexposed X-ray film plates is influenced by a lifting mechanism (not shown) in such manner that the uppermost plate 12a is always situated in height with or somewhat above the plane of the support plate 10 and the end surface 24. The pile 12 is arranged such that a corner of the piled plates is situated close to the feeding device 14. The pile is furthermore guided in such manner, for example by means of a guidance rail which is shaped in a special manner and schematically shown in the drawing at 25, that the corner 26 of the uppermost plate just before the exposure will enter between the two end surfaces 23 and 24 of the sleeves 18, 19. In order to ensure that the corner 26 of the uppermost plate will always enter between the surfaces 23, 24 the shown guidance rail 25 may, if desired, be completed with some simple feeding mechanism, for example in the shape of a mechanical snap device, a rotatable wheel or the like. The required motion of the film plate for ensuring that the corner 26 enters between the gripping surfaces 23, 24 is very small, of the magnitude a few millimeters, which enables to shape the guidance mechanism for this transport very simple.

The feeding of the film plate to exposure position opposite the opening 16a in the support plate 10 is initiated by excitation of the electromagnet 22. Then the lower end surface 23 of the sleeve 19 is pressed toward the upper end surface 24 of the sleeve 18, squeezing the corner 26 of the plate 12a between these surfaces 23, 24. The continuous rotation of the lower sleeve 18 swings the gripped plate about the shaft 17, the upper sleeve 19, which is still pressed against the lower sleeve 18, following the rotation. The swinging motion is terminated when another corner 26a of the plate enters the ejection mechanism 15.

This mechanism 15 is constructed in identically the same manner as the device 14 and consists of a fixed shaft 27 with sleeves 28, 29, a driving wheel 31 for the lower sleeve, an electromagnet 32 for displacing the upper sleeve and end surfaces 33, 34 provided with frictional layers.

The shaft 27 is suitably so situated that the described swinging motion of the plate 12a about the shaft 17, produced by the feeding-in device 14, is interrupted as the corner 26a of the plate abuts against the shaft 27. The plate has then reached the correct position for exposure. Just before this position has been reached, a microswitch 35 is actuated, the output signal of which indicates that a filmplate is situated in correct position for exposure.

In this moment the electromagnet 22 is deenergized so that the frictional surfaces 23, 24 will release the corner 26 of the plate 12a. At the same time an electromagnet 36 is energized, which electromagnet acts upon the pressure plate 11 in direction downwardly to the support plate 10, so that the film plate is pressed therebetween.

After exposure of the plate feeding-out is effected by the mechanism 15 in a similar manner as the feeding-in by the device 14.

The feeding-out is initiated thereby that the electromagnet 32 is energized at the same time as the electromagnet 36 associated with the pressure plate is deenergized. Upon deenergization of the magnet 36 the plate 11 will be lifted upwardly by a spring (not shown) so that the film plate 12a will be free, while energization of the magnet 32 presses the corner 26a of the film plate between the sleeves 28, 29. Energization of the magnet 32 is suitably somewhat delayed in relation to the deenergization of the magnet 36 so that the plate is certainty free when the corner 26a is gripped by the grip surface 33, 34. The continuous rotation of the sleeve 28 will swing the plate about the shaft 27 after being pressed between the surfaces 33 and 34. This motion is continued until the film plate has completely left the support plate 10, and then the magnet 32 is deenergized so that the plate will fall down in a store (not shown) at the left in the drawing.

The whole may suitably be controlled such that a new unexposed X-ray film plate is feeding-in already before the exposed plate has been fed-out so that the two plates may momentarily overlap each other on the support plate 10. It is preferably then that the plate which is feeding-in from the pile 12 always is situated above the plate which has already been exposed and is under feeding-out. This also prevents the plate which is feeding from being stopped by abutting the edge of the opening 16a. In order to ensure that the incoming plate will always be situated above the plate which is fed-out the support plate 10 may be wholly or partly inclined, as indicated at 37 by dotted line in the drawing.

The electrical control for achieving the described operation can be realized in many ways. In the drawing a simple control circuit is shown, in which the primary control device is formed by a program device 38, which is completed with a simple logic device 39 with a number of AND-gates. It is assumed for the function of the control circuit that the plate which is feeding-out has released the switch 35 before feeding-in of the next plate is initiated.

In the shown example the program control device consists of a program disk 40 comprising four control tracks 41, 42, 43 and 44 arranged on a shaft 45. This shaft 45 is driven by the same motor 20 which is arranged for driving the feeding-in and feeding-out devices 14 and 15, whereby the speed of the whole exchange mechanism can be increased or decreased only by varying the speed of the motor 20. The control tracks are scanned by means of optic detectors 47, 48, 49 and 50, respectively, which are each situated opposite a light source 47a, 48a, 49a and 50a on the opposite side of the program disk 40. In the individual tracks in the program disk there are recesses of predetermined lengths and in given mutual angular positions. When such a recess during the rotation comes in position opposite an optical detector in each individual track, a signal is obtained from the associated detector, the signals from different detectors being led to four gates 51, 52, 53 and 54 in the logical device 39. The four control tracks 41 – 44 will via the said detectors and gates deliver excitation signals to the electromagnet 22 of the feeding-in device, the electromagnet 36 of the pressure plate 11, the X-ray apparatus 13 and the electromagnet 32 of the feeding-out device in said order. Furthermore the gates in the logical device 39 receive control signal from the said microswitch 35 indicating that a film plate is in correct position for exposure and a signal on a line 55 from the X-ray apparatus 13, which signal indicates that the exposure has been effected.

If a special feeding mechanism is required for pushing the corner 26 of the uppermost plane 12a to a position between the grip surfaces 23 and 24 of the feeding-in device 14 a further control track may be arranged for delivering a signal to the said feeding mechanism in an interval before the appearance of the signals from the shown control tracks.

The function is as follows.

At the beginning of the actual operation cycle the plate 10 is either (at start) or an exposed plate is under feeding-out (at exchange), it being assumed in the latter case that the film plate has come so far in its motion that the microswitch 35 is not actuated. The uppermost one of the unexposed plates is situated with its corner 26 between the grip surfaces 23, 24 of the feeding in device 14.

Feeding-in is initiated when the detector 47 associated with the first control track 41 delivers a signal to the gate 51. At an inhibiting input the gate 51 receives the output signal from the switch 35. As this switch is not actuated and does not deliver any output signal the gate 51 is open and the signal from 41 will pass through the gate 51 and excite the magnet 22. The corner 26 of the uppermost plate is squeezed tight and the plate is brought to swing across the support plate 10. Immediately before the plate arrives to the correct final position the switch 35 is actuated. This switch delivers a signal to the inhibition input of the gate 51, whereby the gate is blocked and the electromagnet 22 is deenergized. The feeding device 14 releases the plate which is now situated in the correct position for exposure.

The signal from the switch 35 also passes to an input of the gate 52. This gate receives at a second input the output signal from the detector 48 associated with the second control track 42 and at an inhibition input the ready signal from the X-ray apparatus 13. The control track 42 is suitably shaped such that at normal exchange speed it will deliver opening voltage to the gate 52 immediately before the switch 35 is actuated. No inhibition signal is obtained from the X-ray apparatus since no exposure has been started. Thus the gate 52 is opened when a signal is obtained from the switch 35. This signal passes through the gate 52 and excites the electromagnet 36, whereby the plate is squeezed tight by the pressure plate 11.

Immediately thereafter a signal is obtained from the detector 49 associated with the third control track 43, which signal is led to the gate 53. This gate receives at a second input the output signal from the microswitch 35. Provided that a plate is present in correct position on the support plate 10 the gate 53 is open, whereby the signal from the control track 43 passes through the gate 53 and initiates X-ray exposure.

When the exposure is finished a signal is obtained at the output 55. This signal is led on the one hand to the inhibition input of the gate 52 and on the other hand to the fourth gate 54. By the signal on the inhibition input the gate 52 will be blocked, whereby the electromagnet 36 is deenergized and the film plate will be released. The gate 54 obtains at a second input the output signal from the detector 50 associated with the fourth control track 54. As a result of signals on both inputs the gate 54 will deliver an output signal which excites the electromagnet 32. The corner 26a of the exposed plate will be squeezed tight between the grip surfaces 33, 34 of the mechanism 15 and feeding-out is started. Suitably the excitation of the electromagnet 32 is somewhat delayed in relation to the deenergization of the magnet 36 so that the plate with certainty has been released by the pressure plate 11 before it is gripped by the mechanism 15.

The excitation of the electromagnet 32 is interrupted when that the signal from the detector 50 associated with the control track 44 ceases, whereby the ejection mechanism 15 will release the plate which falls down into the store.

During the last portion of the said motion cycle a new plate is already feeding-in.

Means not shown are furthermore arranged for blocking the whole device if any part of the described motion cycle is not carried out correctly.

In the described example the picture exchange speed is determined by the program device or time control device 38, which delivers timing signals. Certain ones of these signals can be dispensed with if one sub-cycle in described manner is allowed to automatically initiate the next sub-cycle. It is also possible to omit the whole time control device and the timing signals delivered by the same and to control the device only by such an automatic sequence control. Hereby the maximal capacity of the device will be utilized but the logical functions will be somewhat more complicated.

A number of other modifications are also possible within the scope of the invention. Thus the sleeves, from which the motion is derived, can be driven intermittently instead of being rotated continuously, so that they are started only when feeding-in or feeding-out, respectively, is effected and in intervals therebetween are stationary. This may for example be achieved by releasing mechanical energy stored in a spring, for example from a continuously rotating shaft. When the sleeve is displaced axially for gripping the corner of the X-ray plate the said spring is released so that it will rotate the sleeve with the gripped X-rayplate for feeding-in and feeding-out, respectively, of the plate. Thereafter a new charging of mechanical energy in the spring is effected automatically. The feeding mechanism can also be of a quite different shape and for example consist of tonguelike gripping jaws, which are rotatably journalled so that they can effect an oscillating rotatable motion about an axis, which is substantially perpendicular to the film plane.

What is claimed is:

1. An X-ray film plate exchanger mechanism for moving individual unexposed x-ray film plates of rectangular shape into an active position where exposure thereof may occur and for removing film plates from said active position, comprising:
   a feeding-in mechanism comprising gripping apparatus for releasably gripping a corner of a film plate urged thereto, said gripping apparatus being mounted adjacent a corner of said active position for rotation about an axis perpendicular to the gripped film plate, swinging the film plate within its own plane about the gripped corner into said active position;
   means for urging a corner of an exposed film plate toward said gripping apparatus of said feeding-in mechanism;
   a feeding-out mechanism substantially the same as said feeding-in mechanism, but positioned adjacent a separate corner of said active position for releasably gripping a separate corner of a film plate in said active position, swinging the film plate within its own plane about said separate gripped corner out of said active position.

2. An X-ray film exchanger mechanism as defined in claim 1 wherein said feeding-in mechanism and said feeding-out mechanism each comprises opposed sleeves rotatively mounted about said axis perpendicular to the gripped film plate for movement toward each other to grip a corner of a film plate therebetween, a controlled force producing mechanism for urging said sleeves together, and means for rotating at least one of said sleeves.

3. An X-ray film exchanger mechanism as defined in claim 2 wherein one of said sleeves is continuously rotated.

4. An X-ray film exchanger mechanism as defined in claim 3 wherein said feeding-in mechanism and feeding-out mechanism operate simultaneously, said feeding-in mechanism swinging an unexposed film plate into said active position over any portion of an exposed film plate still within said active region.

* * * * *

UNITED STATES PATENT AND TRADEMARK OFFICE
CERTIFICATE OF CORRECTION

PATENT NO. : 3,927,327
DATED : December 16, 1975
INVENTOR(S) : GUNNAR VALFRID BERMAS It is certified that error appears in the above—identified patent and that said Letters Patent are hereby corrected as shown below:

Column 4, line 1, "feeding" should be --feeding-in--

Claim 1, line 14, "exposed" should be --unexposed--

Signed and Sealed this

Fourteenth Day of December 1976

[SEAL]

Attest:

RUTH C. MASON
Attesting Officer

C. MARSHALL DANN
Commissioner of Patents and Trademarks